United States Patent [19]

Green

[11] Patent Number: 4,728,177

[45] Date of Patent: Mar. 1, 1988

[54] ELECTROCHROMIC DEVICE

[75] Inventor: Mino Green, London, United Kingdom

[73] Assignee: National Research Development Corporation, London, England

[21] Appl. No.: 772,456

[22] Filed: Sep. 4, 1985

[30] Foreign Application Priority Data

Sep. 4, 1984 [GB] United Kingdom ............... 8422261

[51] Int. Cl.[4] ........................ G02F 1/01; G06K 7/14
[52] U.S. Cl. ................................. 350/357; 235/382.5
[58] Field of Search ..................... 350/357; 235/382.5

[56] References Cited

FOREIGN PATENT DOCUMENTS

| 1540713 | 2/1979 | United Kingdom . |
| 1540714 | 2/1979 | United Kingdom . |
| 2094044 | 9/1982 | United Kingdom . |
| 2081922 | 4/1984 | United Kingdom . |

Primary Examiner—Bruce Y. Arnold
Attorney, Agent, or Firm—Cushman, Darby & Cushman

[57] ABSTRACT

A thin, flexible, portable device (11) may be used as a credit card. The device is encapsulated by front and rear plastics layers. Viewed from the front the device comprises a first electrode of a transparent electrically conductive layer (13); a layer (14) of an electrochromic, metal-sensitive compound which is capable of dissolving metal atoms and which changes color in so doing; a layer of a solid, fast ion conducting electrolyte (15); a second layer of electrochromic material (16), acting as a second electrode; and a layer of electrically conductive material (17). The solid electrolyte layer (15) is substantially non-conductive at room temperature but is highly conductive of metal ions at a raised temperature. To erase information, the entire device is heated to 150° C., and a potential difference is applied between the front electrode (14) and the rear electrode (16), driving all metal atoms out of the front electrochromic material into the rear electrode (16). To write information, a reverse potential is applied and selected localized areas of the device are heated, so that coloration atoms are driven into the electrochromic layer (14) only at selected areas.

20 Claims, 7 Drawing Figures

ELECTROCHROMIC DEVICE

FIELD OF THE INVENTION

The present invention relates to an electrochromic device, and to apparatus for writing information into, or erasing information from, an electrochromic device. A preferred use of the invention is in the provision of a thin, flexible, portable display device which may be used as a credit card, however a wide variety of other uses are envisaged.

In the normal use of the credit card system, the cardholder presents the card at the point of sale, the card acts to identify the cardholder, the sale is effected on a separate credit card payment slip, and there is no immediate way in which the sales person can tell from the card alone the degree of credit worthiness of the cardholder. Where the amount of the transaction is less than a predetermined limit, the sale is usually effected without any special check, and where the value of the transaction exceeds this limit it is necessary for the sales person to telephone the credit card company to check the credit worthiness of the customer. Similarly, there is no immediate way that the cardholder can check how much credit remains on his account. In the case of bank guarantee cards rather than credit cards, it is possible to obtain a statement of the account by inserting the card into an appropriate reader and display station at a bank, but again there is no way of telling from the card itself the state of credit of the associated account.

There is an acknowledged need to provide a portable display device generally of the size and form of a credit card, which will perform the existing functions of a credit card or cheque guarantee card, but in addition will provide a visible display of information as to the credit worthiness of the cardholder, or the present balance of credit which may be allowed to the cardholder or some similar information concerned with the operation of the cardholder's account. Such visible information would be required to be alterable by an appropriately secure reading and writing apparatus at a point of sale, but must be permanent and unalterable by the cardholder during normal use.

DESCRIPTION OF THE PRIOR ART

The need for such a device is set out in published U.K. patent application No. GB 2,094,044 A, and in that application there are indicated very generally some forms of display device which might serve the required purpose. However, the devices set out in that specification are generally complex, and would have disadvantages in a practical situation, where a thin, flexible, simple and rugged device is required.

BRIEF SUMMARY OF THE INVENTION

It is one object of the present invention to provide a portable display device suitable for use as a creditcard or cheque guarantee card, which will be suitable for use in a practical situation. However it is to be appreciated that devices according to the invention will find use in other applications in addition to use as a credit card or cheque guarantee card.

According to the present invention there is provided an electrochromic device comprising at least one electrochromic zone and means for selectively supplying to and withdrawing from said zone guest atoms which produce a colour change in said zone, which means is substantially inoperable at room temperature but is operable at elevated temperature.

In preferred embodiments the invention provides an electrochromic device comprising a first electrode comprising a layer of a transparent electrically conducting material.

a layer of an electrochromic material comprising a metal-sensitive compound which is capable of dissolving metal atoms and which changes colour in so doing, a layer of solid electrolyte, the solid electrolyte being a fast ion conductor in which a fast ion is an ion of the metal which dissolves in the metal-sensitive compound to change the colour thereof, the layer of metal-sensitive compound being in contact with the first electrode and being in contact with the fast ion conductor, and a second electrode, the second electrode being in contact with the said fast ion conductor and being capable of providing and accepting ions the same as the said fast ions of the fast ion conductor, in which the mobility of the fast ions or corresponding atoms in the said electrolyte, the second electrode and/or the electrochromic layer, is or are temperature dependent, there being substantially no mobility at room temperature but the mobility increasing substantially with increase of temperature, whereby the device may be written into or erased by application of a potential difference across the two electrodes at a substantially raised temperature, the display being stable and non-changeable by application of similar potential differences at room temperature.

Preferably, the material or materials in which the mobility of said atoms or ions is low at room temperature and substantially higher at elevated temperatures is the electrochromic material and/or the solid electrolyte.

The metal-sensitive compound may conveniently be termed a "host material" and the said metal atoms may conveniently be termed "guest atoms".

In accordance with another preferred aspect, there is provided in accordance with the present invention, an electrochromic device comprising a first electrode comprising a layer of a transparent electrically conducting material, a layer of an electrochromic material comprising a metal-sensitive compound which is capable of dissolving metal atoms and which changes colour in so doing, a layer of a solid electrolyte, the solid electrolyte being a fast ion conductor in which the fast ion is an ion of the metal which dissolves in the metal-sensitive compound to change the colour thereof, and the layer of metal-sensitive compound being in contact with the first electrode and being in contact with the fast ion conductor, and a second electrode, the second electrode being in contact with the said fast ion conductor and being capable of providing and accepting ions the same as the fast ions of the fast ion conductor, in which the solid electrolyte is substantially non-conductive at room temperature but is readily conductive of the said fast ions at increased temperature, whereby a visible display may be written into or erased from the device by application of a potential difference across the two electrodes at a substantially raised temperature, the display being stable and non-changeable by application of similar potential differences at room temperature.

In this latter aspect, it is preferred that in addition, the rate of diffusion of the said metal atoms into or out of the electrochromic material is low at room temperature but is substantially increased at raised temperatures.

Conveniently the mobility of the said atoms and/or ions in the device is sufficiently increased to allow writing and erasing of information at a temperature of 110° C. or above, preferably 150° C. or above.

It will often be convenient for the solid electrolyte to be opaque. Where the electrolyte material is naturally transparent it may be rendered opaque by loading with a suitable pigment, e.g. a reflective material such as titanium dioxide.

The device set out finds particular application where the device is a thin, flexible, portable device and generally of the size and form of a credit card.

There are two basic forms of the device according to the invention. In one, preferred form, the said first electrode and the said second electrode each extend over a substantial display area of the device on which display area information is to be written, and both electrodes are provided with electrical contacts for applying a general electrical potential difference across the first electrochromic layer and the solid electrolyte layer over the whole display area of the device, the arrangement of the device being such that information can be written in operation at different locations within the said display area by localised heating of the device during application of the general potential difference over the whole display area.

This form is particularly advantageous when applied to a credit card because the credit card can be made to be extremely simple, and it is not necessary to provide a multiplicity of electrical contacts to different segments of a convential numeric or alpha-numeric display.

However there may be provided in accordance with the present invention in a second form an arrangement in which the device has a display area on which information is to be displayed, and there are provided a plurality of electrical contacts leading to different locations within the display area, whereby different required potentials can be applied to different selected locations of the display area during an overall heating of the whole display area, to effect writing and erasing of information in the display area.

In a typical application of the present invention in a credit card, the card carries all the normal information of a credit card, that is to say a magnetic strip carrying information to be read by a bank computer reader, a space for the signature of the cardholder, and an embossed number identifying the account. In addition there is provided a display area which, for example, carries a permanent visible display of the outstanding credit balance of the cardholder. Upon each transaction, the sales person performs the normal functions in a transaction, but in addition inserts the card into apparatus for writing fresh information into the display, a so-called transcriber unit, and enters into the unit the new reduced credit balance of the customer. The transcriber unit then erases the existing display and writes into the credit card the new, reduced, credit total. There are of course a number of ways in which this can be achieved, by appropriate use of micro processing equipment. In a simplest form, the sales person will deduct the value of the present transaction from the shown credit balance on the card, and enter into the transcriber the new, reduced, balance. In more sophisticated arrangements, a reader/transcriber unit may be provided with arrangements to read the displayed existing total from the card, check the total, where necessary, against the customer's account in a central data bank, automatically deduct from the total the value of the present transaction, and finally write into the credit card display the new reduced total.

Where the form of device according to the invention is of the first basic form set out above, there may therefore be provided apparatus for writing information into or erasing information from the device, the apparatus comprising, an enclosure, an aperture allowing insertion of the device into the enclosure, means for applying a general electrical potential difference across the device over the whole of the display area of the device, and means for selectively applying heat to individual locations in the display area.

Alternatively, where the device is of the second basic form set out above, there may be provided apparatus for writing information into or erasing information from the device, the apparatus comprising an enclosure, an aperture allowing insertion of the device into the enclosure, means for applying a general, overall heating effect over the whole of a display area of the device, and means for selectively applying a potential difference across the device at individual locations in the display area.

Considering now preferred forms of the device itself in accordance with the present invention, in one arrangement the said solid electrolyte is made sufficiently opaque to isolate the said second electrode optically when the device is viewed through the first electrode, and in such an arrangement, the second electrode is used as a sink and source of ions to pass through the solid electrolyte to the electrochromic layer at the front of the device, the contrast being between a view of the solid electrolyte and a view of the electrochromic layer when coloured by metal atoms. Typically in such an arrangement any localised area can be made to appear dark blue when colouration atoms are inserted into the electrochromic layer, or can be made to appear white when the colouration atoms are removed from the electrochromic layer, leaving it transparent so that the viewer sees the opaque, preferably white, solid electrolyte layer through the transparent first electrode and the bleached electrochromic layer.

Another form of the device which may be used is one which makes use of a property of electrochromic materials, which is that layers of different thickness or of different materials have different efficiencies of colouration for any specified amount of colouration ions in the layer. In general, the colouration is more efficient, for a given number of atoms, for a thicker layer of electrochromic material than for a thinner layer of the same material.

In accordance with this feature of the invention, it may be arranged that, in addition to the first-mentioned layer of electrochromic material in the device, the said second electrode also comprises a layer of an electrochromic, metal-sensitive compound, which is capable of dissolving the same metal atoms as the first mentioned electrochromic layer and which changes colour in so doing, the said solid electrolyte layer being substantially transparent, and the two electrochromic layers being of different thickness and such that the same quantity of colouration ions in the thicker layer produces a deeper colouration and in the thinner layer produces a lesser colouration, whereby, when the device is heated and appropriate potentials are applied, metal atoms can be transferred from one electrochromic layer to the other through the solid electrolyte so as to produce either a greater of lesser colouration of the device.

Typically, in such an arrangement, by transferring the colouration atoms between the two layers, any specified area can be changed from a relatively dark blue colour to a relatively light blue colour.

Instead of using two layers of similar electrochromic material, the layers differing in thickness, one may use two layers of different electrochromic materials of equal or of different thickness, the materials having inherently different colouration efficiencies. In the most preferred arrangement of this type, one of the electrochromic materials in fact exhibits no substantial visible colour change. Metal-sensitive oxide bronzes have recently been developed which have an absorption maximum in the ultra violet and which exhibit little visible colour change, at least in thin films, for quite substantial changes in guest atom concentration.

Such metal-sensitive materials so far known are based on solid solutions of $Mo_3$, and $V_2O_5$, preferably in the formula ratio of 1:3 to 3:1, more preferably 1:2 to 2:1 and most preferably about 1:1 The guest metal atom employed is preferably lithium but the other guest metal atoms mentioned herein may also be employed.

Using a layer of material of this type, all of the layers of the device may be transparent and the device may be mounted on an opaque sheet of backing material.

Considering now the various preferred materials which may be used in accordance with the various aspects of the invention set out above, preferably the, or each, electrochromic material is an oxide bronze of a transition metal in its highest oxidation state. It is particularly preferred that the metal-sensitive compound is an oxide of a transition metal selected from the group comprising tungsten oxide ($WO_3$), molybdenum oxide ($MoO_3$), vanadium oxide ($V_2O_5$), iridium oxide ($IrO_2$) and niobium oxide ($Nb_2O_5$), and various solid solutions of two or more thereof.

In connection with the prior patent application which has been mentioned, GB No. 2,084044 A, there has been suggested in that application that a display may use a sodium-$\beta$-alumina substrate, but it is thought that such material would be impractical in use due to its brittle nature in certain situations and for certain purposes. It is particularly preferred in accordance with the present invention that the said solid electrolyte, which may form the basic substrate of the device, is a polymeric/inorganic solid electrolyte containing an alkali metal, preferably of the kind known as Grenoble polymeric electrolytes, after the development work carried out at Grenoble University, described for example in the pioneer paper P. W. WRIGHT (Br. Poly. J. 1975 7,319-327z). Preferred materials for the said solid electrolyte include a combination of a polyethylene oxide or a polypropylene oxide with an alkali metal compound. When such an electrolyte is required to be opaque it may be loaded with a suitable pigment, e.g. 5% by volume of $TiO_2$ powder in suspension to render the electrolyte white.

In general, in the present invention, it is preferred that the said fast ion is an alkali metal selected from the group comprising lithium, sodium and potassium.

As explained above, the material of the second electrode may be the same as or different from the said electrochromic material. Except for those embodiments where it is desired that the second electrode exhibit a negligable or lesser visible colour change then the said electrochromic material, the said second electrode is conveniently made of an appropriate oxide bronze selected from the group comprising a tungsten bronze of the general formula of the form $M_xWO_3$ where M is taken from the group comprising lithium, sodium and potassium, and x has a value between 0.05 and 0.5.

In general, in the construction of devices according to the present invention, attention is drawn to the importance of using for the electrochromic material a water-free, fine grained, polycrystalline material which is stoichiometric, and has a layer thickness preferably in the range 0.2 micron to 2 microns, most preferably 0.3 micron to 0.8 micron. Other preferred criteria for the electroctrochromic material, are set out in our previously published U.K. patent application NO. GB 2,081,922 A.

DETAILED DESCRIPTION

Figure 1:
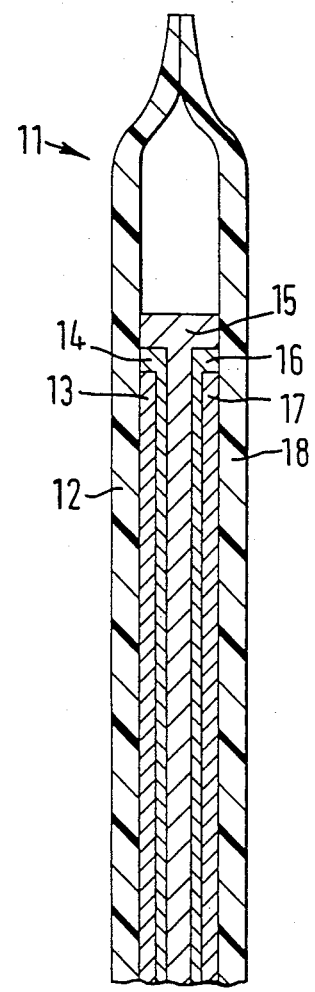
Figure 4:
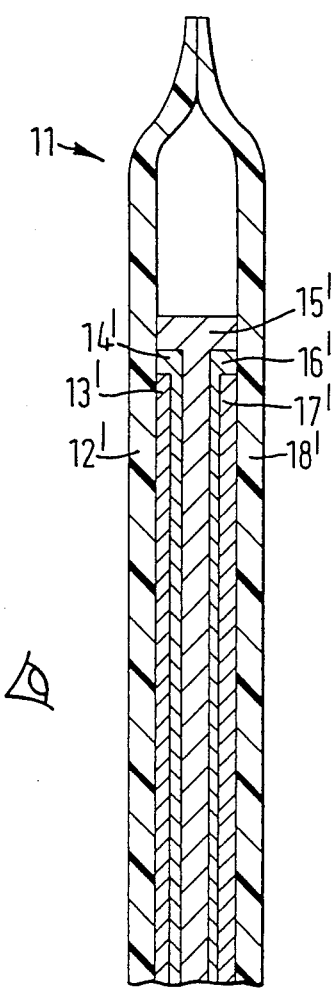
Figures 2A, 2B, 3A, 3B:
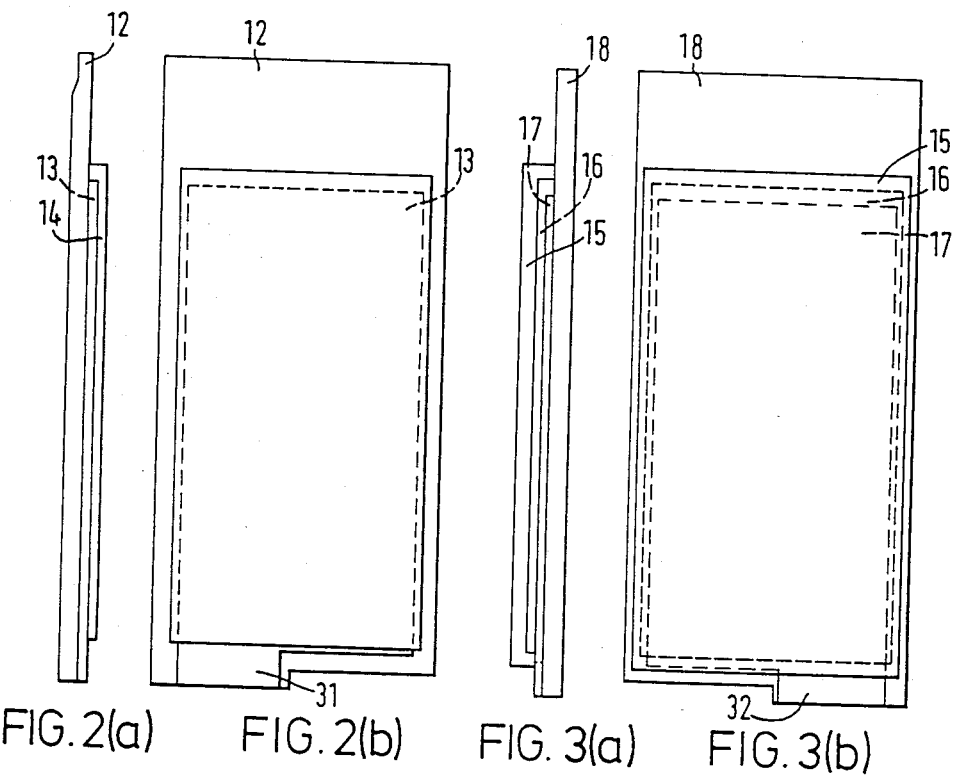
Figure 5:
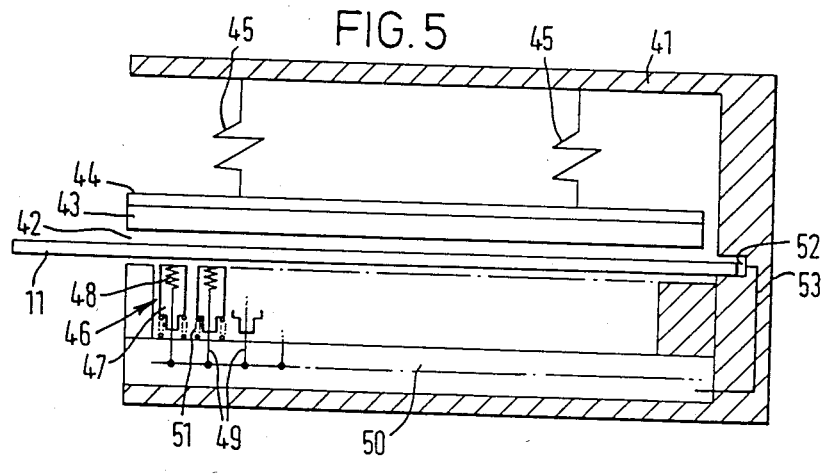

Embodiments of the invention will now be described by way of example with reference to the accompanying drawings in which:

FIG. 1 is a diagrammatic cross-section through an electrochromic display device embodying the invention;

FIGS. 2(a) and 2(b) show respectively diagrammatic side and plan views of a front half of the device shown in FIG. 1;

FIGS. 3(a) and 3(b) show respectively diagrammatic side and plan views of a rear half of the device shown in FIG. 1;

FIG. 4 is a diagrammatic cross-section through an alternative form of display device embodying the invention; and FIG. 5 is a diagrammatic section of apparatus for erasing information from, and writing information into, a display device according to the invention.

Referring to FIG. 1 there is shown a portable display device in a form of a thin flexible card-like device suitable for use as a credit card or cheque card.

The viewing side is on the left in FIG. 1, and the device comprises a series of layers as follows, taken from left to right in the figure;

a front layer 12 of transparent synthetic plastics material forming part of the encapsulation of the device;

an electrically conductive transparent layer 13 forming a first electrode, and formed for example of indium tin oxide;

a first layer 14 of electrochromic material, for example a host layer of molybdenum oxide containing lithium guest atoms;

a layer 15 of a solid fast ion electrolyte containing an inert optically reflecting powder which is temperature dependent in its conductivity, and is capable at a high temperature of conducting ions of atoms which colour the electrochromic material 14;

a layer 16 of material capable of acting as a source and sink of ions of the said colouration atoms of the electrochromic layer 14, the layer 16 acting as a second electrode, and for example the layer 16 being constituted by the same material as the electrochromic layer 14, for example molybdenum oxide;

a second layer 17 of an electrically conductive, transparent, material such as indium tin oxide, acting as an electrical contact for the second electrode 16; and a rear layer 18 of opaque, preferably white, synthetic plastics material, forming part of the encapsulation of the device.

The optical properties of the layers are as follows. The front plastics layer 12, and the first electrode 13 are both permanently transparent. The front layer 14 of electrochromic material is capable of being bleached to be transparent upon withdrawal of its colouration atoms. The solid electrolyte layer 15 is opaque, preferably white, to optically isolate the electrochromic layer 14 from the second electrode 16.

The arrangement and operation of the electrochromic display device shown in FIG. 1 is in general similar to that described in our previous UK patent application, Publication No. GB 2081922 A, except that the layer of solid electrolyte 15 is chosen to have a highly temperature dependent electrical conductivity. At room temperature the electrolyte 15 is substantially non-conductive, but becomes highly conductive of the fast ions at a raised temperature above, for example, 150°.

When the temperature is raised in this way, and a positive potential is applied to the front face electrode 13, lithium is driven to the back electrode 16 and the viewer has only a view of the opaque electrolyte 15. When the front face electrode 13 is made negative, lithium is inserted into the molybdenum oxide of the front electrochromic layer 14 which becomes coloured blue. Where for example the solid electrolyte 15 is red, the combination of blue with a red backing looks black, or where a white electrolyte 15 is used, the contrast is white to blue.

As has been mentioned, the display device described is not addressable at room temperature, for two reasons. First, and most important, the electrolyte layer 15 is highly electrically resistive at room temperature, so that an impractically high voltage would have to be applied for an impractically long time to obtain the approximately three millicoulombs per square centimetre of charge which is necessary for writing. Second, and less important, it is the case that, unless a high atomic number atom is used, the polycrystalline grains of the electrochromic layer 14, which must accept or give up alkali metal (e.g. lithium) atoms, will have a grain size about 100–300 A in mean width (the grains being approximately cubic in shape) which is larger than the smallest grain size obtainable so that the rate of acceptance of alkali metal will be restricted at room temperature.

Materials which are suitable for the device set out above are as follows.

The front electode 13 is conveniently of indium tin oxide which is a transparent electrically conducting coating standard in the display industry.

The host material of the electrochromic layer 14 is a transition metal oxide, preferably molybdenum oxide ($MoO_3$) or tungsten oxide ($WO_3$) or a solid solution of these two. Other solid solutions, using vanadium oxide ($V_2O_5$) as one of the components, can be used with benefit (especially as it affects the optical properties). Deposition must be under conditions which ensure water-free, fine grained, material, generally as set out in our published UK patent application No. GB 2081922 A. The layer thickness of the material 14 may be in the range 0.1 to 1 micron, the preferred range being 0.25 to 0.75 microns, most preferably about 0.5 microns. Alkali metal to the extent of $1 \times 10^{16}$ to $2 \times 10^{17}$ atoms per centimetre is incorporated in one of the host oxide films 14 and 16 during deposition by co-deposition. The preferred range of alkali metal in one layer is $3 \times 10^{16}$ to $1.5 \times 10^{17}$ and a most preferred value is about $7 \times 10^{16}$ atoms per square centimetre.

The solid, alkali metal conducting, electrolyte 14 is preferably one of the group of polymer electrolytes first developed by P. W. Wright (Br. Poly. J. 1975 7,319-327) and since extensively developed and modified by M. Armand and co-workers at Grenoble University (France). A typical composition useful in this cell is polyethylene oxide (molecular weight approximately $10^6$) blended with Li $CF_3$ $CO_2$, or more preferably Li $CF_3$ $SO_3$, so that the oxygen to lithium ratio is approximately 5.5 to 1 and gives an activation energy of approximately 1.3 eV with a room temperature conductivity of approximately $10^{-11}$ ohm$^{-1}$ cm$^{-1}$, and conductivity at 150° C. of $10^{-6}$ ohm$^{-1}$ cm$^{-1}$. Higher activation energies may require diminished upper temperatures and vice versa. An activation energy of 1.3 eV is an optimum value, but values between 1 and 1.8 eV are acceptable. A layer thickness of 0.5 to 10 microns is preferred, most preferably 3 microns. Spin-on techniques or similar are used for deposition.

Conveniently the electrolyte layer 15 may consist of polyethylene oxide in combination with lithium cyanide in a ratio of eight parts PEO to one part LiCN. Conveniently the electrolyte contains a dye, e.g. a red merocyanin, or a scattering texture e.g. $TiO_2$ 5% by volume.

Referring now to FIGS. 2(a) to 3(b), there will be described a method of producing the device shown in FIG. 1. FIGS. 2(a) and 2(b) show in side view and plan view one half of the device of FIG. 1. In manufacture, first a layer of indium tin oxide 13 is deposited on the front, plastics sheet 12, and a fine grained molybdenum oxide layer 14 is deposited onto the indium tin oxide. The indium tin oxide layer extends to form an imput electrical contact indicated at 31 in FIG. 2(b). Similarly, as shown in FIG. 3(a), a layer of indium tin oxide 17 is deposited on the rear plastic sheet 18 and onto this is deposited the rear layer of molybdenum oxide 16. Finally the solid electrolyte layer 15 is deposited onto the electrochromic layer 16. As shown in FIG. 3(b), the indium tin oxide layer 17 extends outwardly to form a further electrical contact 32. Finally the two halves of the device are secured together as shown in FIG. 1 and the entire device is sealed around the edge so as to prevent the entrance of atmospheric water vapour to the electrochemical cell.

Referring now to FIG. 4, there is shown an alternative form of display device embodying the invention. The viewing side is again on the left in the figure, and the layers comprise, from the viewing side, a synthetic plastic flexible transparent sealing layer $12^1$; a first electrode $13^1$, comprising a transparent electrically conductive layer, for example indium tin oxide; a layer $14^1$ of electrochromic material, for example molybdenum oxide containing lithium atoms; a layer $15^1$ of a transparent solid fast ion conducting electrolyte, such as a polymeric inorganic solid electrolyte containing lithium ions; a second layer $16^1$ of an electrochromic material, for example molybdenum oxide; a second electrically conductive layer $17^1$, for example of indium tin oxide, and a rear encapsulating layer of synthetics plastics material $18^1$.

In the device shown in FIG. 4, the front encapsulating layer $12^1$, the first electrically conducting layer $13^1$, the solid electrolyte layer $15^1$, and the second electrically conducting layer $17^1$ are all arranged to be permanently transparent. The first electrochromic layer $14^1$ is arranged to be coloured when containing lithium atoms, but to be transparent when bleached by the withdrawal of all lithium atoms. The second electrochromic layer 16¹ is arranged to be coloured when containing lithium atoms, but it is not necessary for the second electrochromic layer 16¹ to be capable of total bleaching by removal of lithium atoms. The rear encapsulation layer 18¹ is arranged to be opaque, preferably white, to provide a background for colouration.

In the state shown in FIG. 4, the device, when viewed from the left side as shown, has a blue appearance due to the presence of lithium atoms in the electrochromic layer 14¹. The solid electrolyte layer 15 is chosen such as to be substantially nonconducting conducting at room temperatures, but to be readily conducting at raised temperatures, as set out hereinbefore. When in operation the temperature of the device is raised to, say, 150° C., and an electrical potential difference is applied between the first and second electrically conductive layers 13¹ and 18¹, the lithium atoms in the electrochromic layer 14¹ can be driven out of the electrochromic layer 14¹ through the solid electrolyte 15¹ and into the second electrochromic layer 16¹. When the front electrochromic layer 14¹ has been completely bleached and is transparent, the viewer will then see colouration in the rear electrochromic layer 16¹, through the now transparent front electrochromic layer 14¹.

However, the two electrochromic layers 14¹ and 16¹ are made of different thicknesses, so that the colouration produced by the same quantity of lithium atoms in one layer will be significantly different from the colouration produced in the other layer by the same quantity of lithium atoms. Thus by transferring the colouration atoms from one layer to another, the depth of colouration seen from the front of the device may be varied from, say, dark blue, to light blue.

Although a number of variations of layer thickness, and colouration changes, are possible, one convenient arrangement is for the rear electrochromic layer 16¹ to be a thinner layer than the front electrochromic layer 14¹. When the lithium atoms are in the rear layer 16¹, the colouration is less, and the white background 18¹ provides a general light background when viewed through the bleached transparent electrochromic layer 14¹. When the lithium atoms are transferred to the front, thicker, electrochromic layer 14¹, the colouration deepens.

In this embodiment of the invention, shown with reference to FIG. 4, it will be appreciated that the front conducting layer 13¹ may be regarded as a first electrode, and the rear electrochromic layer 16¹ may be regarded as a second electrode, the application of an electrical potential between the first electrode and the second electrode (by way of the rear electrically conducting layer 17¹) producing change in the colour of the front electrochromic layer 14¹ due to movement of ions through the solid electrolyte 15¹. However, as has been explained, the second electrode 16¹ does itself experience a change of colour, which produces a visible effect from the front of the device.

In a variation of what is illustrated in FIG. 4, one of the two layers of electrochromic material may be selected to be substantially colourless even when containing the guest lithium atoms. An example of such a material is $MO_3/V_2O_5$ 1:1 solid solution. The two layers may be of equal thickness.

When the lithium atoms are in the colourable electrochromic layer the device will appear coloured. When the lithium atoms are transferred to the $MO_3/V_2O_5$ layer, the originally coloured layer will become bleached.

In such an example, the difference in colouration efficiency between the two electrochromic layers is due to the difference between the electrochromic materials rather than the layer thickness.

Referring now to FIG. 5 there is shown apparatus for erasing information from and writing information into an electrochromic display device such as has been described in the preceeding description. The apparatus comprises an enclosure 41 with an aperture 42 into which the card can be inserted. When in place the card 11 is held by an insulator layer 43 mounted on a backing plate 44 which is pressed downwardly by electromechanical pressure drives 45. The card is pressed downwardly against a bank of individual heaters 46. Each heater 46 comprises a moveable square pin 47 in which is mounted a heating element 48 connected by a lead 49 to an addressable system 50 which allows heating current to be supplied to various selected heaters. Each heating pin 47 is urged upwardly by a spring 51. The square pins 47 may be for example 2 m.m.×2 m.m. in cross-section and are arranged in a matrix which can be switched electronically to give the symbols required.

Within a groove 52 at the rear of the enclosure 41 are positioned two electrical contacts 53 allowing a required potential to be put across the device 11 by use of the contacts 31 and 32 shown in FIGS. 2(b) and 3(b).

In operation, a unidirectional voltage, for example 5 volts, is applied to the card through the electrical connections 52 and 53 with the positive terminal on the back electrode 32. The entire temperature of the cell is raised in the enclosure to about 150° C. for a period of several seconds. Under these conditions all electrochromically written information is removed from the front face of the device 11.

The overall heating is then removed, and the cell is heated for several seconds in specific local areas to about 150° C., by feeding current to selected ones of the heating elements 48. During this period of localised heating the potential applied to the electrical connections 52 and 53 is reversed, and this causes the selected local areas of the display device 11 to be coloured, for example blue or black, as has been described above. By this localised heating, the words or numbers required on the front face of the display device are written in. With an activation energy for ionic conduction of about 1.3 eV, a high temperature writing time of about 1 second, and a line resolution of about 50 microns, the room temperature memory of the display is between one and five years.

In an alternative arrangement, instead of having one electrically isolated electrochromic cell on the plastic substrate of the display device, a pattern of electrodes in one of the plastic substrates can be provided to enable electrical addressing of selected areas when the temperature is raised to an overall level of about 150° or more. This still leaves the display unalterable at room temperature. In this case the apparatus for erasing and writing information is a heatable enclosure with a set of slit sockets for the card electrodes, and the necessary power supply and electronic switching arrangements. Although such a device is more complicated, it has an advantage in that arrangements can be made to read the device electronically by use of the contacts from the electrodes on the card.

I claim:

1. An electrochromic device comprising at least one electrochromic zone and means for selectively supplying to and withdrawing from said zone guest atoms which produce a colour change in said zone, which means is substantially inoperable at room temperature but is operable at elevated temperature.

2. An electrochromic device as claimed in claim 1 comprising a first electrode comprising a layer of a transparent electrically conducting material, a layer of an electrochromic material comprising a metal-sensitive compound which is capable of dissolving metal atoms and which changes colour in so doing, a layer of solid electrolyte, the solid electrolyte being a fast ion conductor in which a fast ion is an ion of the metal which dissolves in the metal-sensitive compound to change the colour thereof, the layer of metal-sensitive compound being in contact with the first electrode and being in contact with the fast ion conductor, and a second electrode, the second electrode being in contact with the said fast ion conductor and being capable of providing and accepting ions the same as the said fast ions of the fast ion conductor, in which the mobility of the fast ions or corresponding atoms in at least one of the said electrolyte, the second electrode and the electrochromic layer, is or are temperature dependent, there being substantially no mobility at room temperature but the mobility increasing substantially with increase of temperature, whereby the device may be written into or erased by application of a potential difference across the two electrodes at a substantially raised temperature, the display being stable and non-changeable by application of similar potential differences at room temperature.

3. A device according to claim 2 in which the said solid electrolyte is made sufficiently opaque to isolate the said second electrode optically when the device is viewed through the first electrode, the second electrode being used as a sink and source of ions to pass through the solid electrolyte to the electrochromic layer at the front of the device, a contrast being produced between a view of the solid electrolyte and a view of the electrochromic layer when coloured by metal atoms.

4. A device according to claim 2 in which the said second electrode comprises a layer of a material comprising a metal-sensitive compound, which is capable of dissolving the same metal atoms as the first mentioned electrochromic layer.

5. A device according to claim 4 wherein the material of the second electrode changes colour in response to said metal atoms, thus constituting a second electrochromic chromic layer, the said solid electrolyte layer being substantially transparent, and the two electrochromic layers being of different thickness and such that the same quantity of colouration atoms in the thicker layer produces a deeper colouration and in the thinner layer produces a lesser colouration, whereby when the device is heated and appropriate potentials are applied, metal atoms can be transferred from one electrochromic layer to the other through the solid electrolyte so as to produce either a greater or lesser colouration of the device.

6. A device according to claim 4 in which the metal-sensitive compound is an oxide of a transition metal selected from the group comprising tungsten oxide ($WO_3$), molybdenum oxide ($MoO_{3_3}$), vanadium oxide ($V_2O_5$), iridium oxide ($IrO_2$) and niobium oxide ($Nb_2O_5$), and solid solutions of at least two thereof.

7. A device according to claim 4 wherein the material of the second electrode is an oxide bronze which, at least in thin layers, undergoes no substantial visible colour change on a substantial change in the quantity of said metal atoms dissolved therein.

8. A device as claimed in claim 7 wherein the said oxide bronze is based on a solid solution of $MoO_3$ an $V_2O_5$.

9. A device as claimed in claim 8 wherein the formula ratio of $MoO_3$ to $V_2O_5$ is substantially 1:1.

10. A device according to claim 2 in which the said fast ion is an alkali metal selected from the group comprising lithium, sodium and potassium.

11. A device according to claim 2 in which the said first electrode and the said second electrode each extend over a substantial display area of the device on which display area information is to be written, and both electrodes are provided with electrical contacts for applying a general electrical potential difference across the first electrochromic layer and the solid electrolyte layer over the whole display area of the device, the arrangement of the device being such that information can be written in operation at different locations within the said display area by localised heating of the device during application of the general potential difference over the whole display area.

12. An electrochromic device as claimed in claim 1 comprising a first electrode comprising a layer of a transparent electrically conducting material, a layer of an electrochromic material comprising a metal-sensitive compound which is capable of dissolving metal atoms and which changes colour in so doing, a layer of a solid electrolyte, the solid electrolyte being a fast ion conductor in which a fast ion is an ion of the metal which dissolves in the metal-sensitive compound to change the colour thereof, and the layer of metal-sensitive compound being in contact with the first electrode and being in contact with the fast ion conductor, and a second electrode, the second electrode being in contact with the said fast ion conductor and being capable of providing and accepting ions the same as the said fast ions of the fast ion conductor, in which the solid electrolyte is substantially non-conductive at room temperature but is readily conductive of the said fast ions at increased temperature, whereby a visible display may be written into or erased from the device by application of a potential difference across the two electrodes at a substantially raised temperature, the display being stable and non-changeable by application of similar potential differences at room temperature.

13. A device according to claim 1 in which the mobility of atoms and/or ions in the device is sufficiently increased to allow writing and erasing of information at temperatures of 110° C.

14. A device according to claim 1 in which the device is a thin, flexible, portable device and generally of the size and form of a credit card.

15. A device according to claim 1 in which the electrochromic zone is provided by an oxide bronze of a transition material in its highest oxidation state.

16. A device according to claim 2 in which the said solid electrolyte is a polymeric/inorganic solid electrolyte containing an alkali metal.

17. A device according to claim 16 in which the said solid electrolyte comprises a combination of an alkylene oxide selected from the group consisting of polyethylene oxide and polypropylene oxide with an alkali metal compound.

18. A device according to claim 2 in which the device has a display area on which information is to be displayed, and there are provided a plurality of electrical contacts leading to different locations within the display area, whereby different required potentials can be applied to different selected locations of the display area g during an overall heating of the whole display area, to effect writing and erasing of information in the display area.

19. Information storage and display apparatus comprising as an information storage and display medium an electrochromic device comprising:
a first electrode including a layer of a transparent electrically conducting material;
a layer of an electrochromic material including a metal-sensitive compound which is capable of dissolving metal atoms and which changes color in so doing;
a layer of solid electrolyte, the solid electrolyte being a fast ion conductor in which a fast ion is an ion of the metal which dissolves in the metal-sensitive compound to change the colour thereof, the layer of metal-sensitive compound being in contact with the first electrode and being in contact with the fast ion conductor;
a second electrode, the second electrode being in contact with said fast ion conductor and being capable of providing and accepting ions the same as said fast ions of the fast ion conductor, in which the mobility of the fast ions or corresponding atoms in at least one of said electrolyte, said second electrode and said electrochromic layer, is or are temperature dependent, there being substantially no mobility at room temperature but the mobility increasing substantially with increase of temperature, whereby the device may be written into or erased by application of a potential difference across the two electrodes at a substantially raised temperature, the display being stable and non-changeable by application of similar potential differences at room temperature, and in which said first electrode and said second electrode each extend over a substantial display area of the device on which display area information is to be written, and both electrodes are provided with electrical contacts for applying a general electrical potential difference across the first electrochromic layer and the solid electrolyte layer over the whole display area of the device, the arrangement of the device being such that information can be written at different locations within said display area by localized heating of the device during application of the general potential difference over the whole display area and comprising as means for writing information into or erasing information from said device;
an enclosure;
an aperture allowing insertion of the device into the enclosure; and
means for applying a general electrical potential difference across the device over the whole of the display area of the device, and means for selectively applying heat to individual locations in the display area.

20. Information storage and display apparatus comprising as an information storage and display medium an electrochromic device comprising:
a first electrode including a layer of a transparent electrically conducting material;
a layer of an electrochromic material including a metal-sensitive compound which is capable of dissolving metal atoms and which changes color in so doing;
a layer of solid electrolyte, the solid electrolyte being a fast ion conductor in which a fast ion is an ion of the metal which dissolves in the metal-sensitive compound to change the color thereof, the layer of metal-sensitive compound being in contact with the first electrode and being in contact with the fast ion conductor;
a second electrode, the second electrode being in contact with said fast ion conductor and being capable of providing and accepting ions the same as the said fast ions of the fast ion conductor, in which the mobility of the fast ions or corresponding atoms in at least one of said electrolyte, said second electrode and said electrochromic layer, is or are temperature dependent, there being substantially no mobility at room temperature but the mobility increasing substantially with increase of temperature whereby the device may be written into or erased by application of a potential difference across the two electrodes at a substantially raised temperature, the display being stable and non-changeable by application of similar potential differences at room temperature, and in which the device has a display area on which information is to be displayed, and there are provided a plurality of electrical contacts leading to different locations within the display area, whereby different required potentials can be applied to different selected locations of the display area during an overall heating of the whole display are, to effect writing and erasing of information in the diaplay area, and comprising as means for writing information into or erasing information from said device;
an enclosure;
an aperture allowing insertion of the display device into the enclosure; and
means for applying a general, overall heating effect over the whole of a display area of the device, and means for selectively applying a potential difference across the device at individual locations in the display area.

* * * * *